May 3, 1927.
R. J. STARR
1,627,418
RESILIENT WHEEL
Filed April 3, 1923
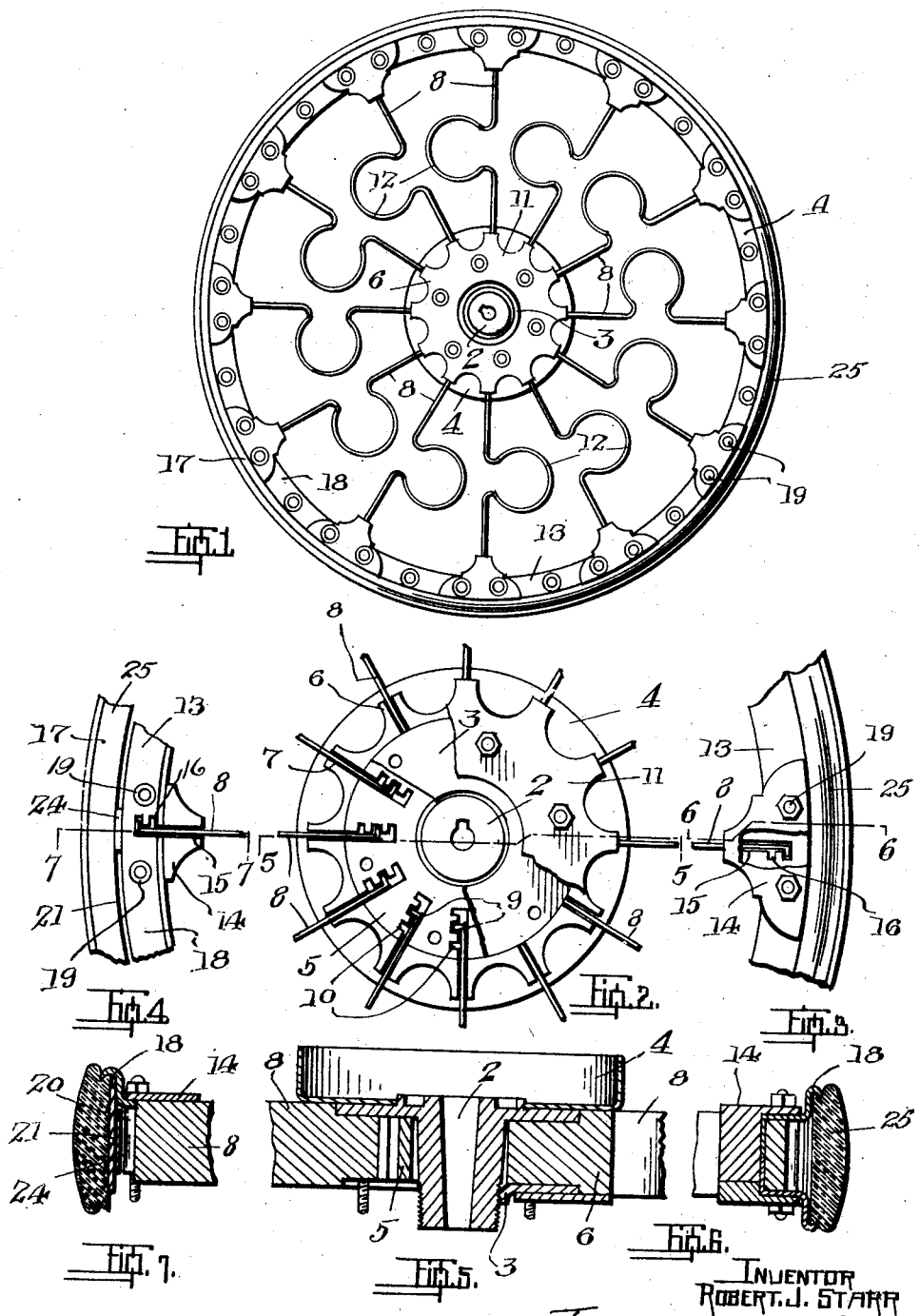
INVENTOR
ROBERT. J. STARR
BY Fetherstonhaugh & Co
ATT'YS.

Patented May 3, 1927.

1,627,418

UNITED STATES PATENT OFFICE.

ROBERT JULIUS STARR, OF BRIERCREST, SASKATCHEWAN, CANADA.

RESILIENT WHEEL.

Application filed April 3, 1923. Serial No. 629,666.

My invention relates to improvements in resilient wheels in which the spokes are formed out of springs and the object of my invention is to replace the unsatisfactory pneumatic tire and to provide resiliency in railroad and street car wheels and all other vehicle wheels, as well as belt pulleys.

With these and other objects in view, the invention consists essentially in the novel arrangement and construction of parts described in the present specification and illustrated by the accompanying drawings that form part of the same.

Referring now to the drawings, in which like characters of reference indicate corresponding parts in each figure.

Figure 1 is a side elevation showing the outside of an automobile wheel embodying my invention.

Figure 2 is an enlarged detail with parts broken away to show the plate as well as the outer rim of the centre fill in connection with my invention as applied to a Ford wheel.

Figure 3 is an enlarged detail of part of the rim with part of the stub broken away to show slot and recesses in the rim for receiving the outer end of the spoke with the enlargement or hook thereon.

Figure 4 is a similar view of the rim with the outside part of the rim and stub spoke removed, showing the inside construction.

Figure 5 is a section on line 5—5 of Figure 2.

Figure 6 is a section on line 6—6 of Figure 3.

Figure 7 is a section on line 7—7 of Figure 4.

In the drawings, A designates my improved wheel as a whole comprising, as here shown, a Ford pattern hub 2 with flange 3 and brake drum 4, while 5 is an auxiliary hub adapted to fit the hub 2 and is held in position by the flange 3. The auxiliary hub which extends beyond the periphery of 2 and 3 is preferably increased in thickness so as to be flush with the outer surface of the flange 3. The outer periphery of hub 5 is formed with a plurality of stub spokes 6 adapted to extend radially and in which are slots 7 extending into and towards the centre of the hub 2 and designed to engage with the flat spring spokes 8. The inner ends of these spring spokes are formed with lugs or hooks 9 designed to engage with recesses 10 in the slots 7. The hub 5 may be of any suitable construction according to the pattern of the hub, as long as it is enabled to fit between the hub 2 and the plate 3.

On the inner side of the wheel the brake drum 4 supports the spring spokes 8, and on the other side a plate 11 performs the same service.

Ordinary bolts are employed to hold the parts of the hub, but special bolts may be used if desired.

The spokes 8 are made up of flat spring material, or other suitable material, and may be of any desired form. As here shown, the inner ends of these spokes are formed with spaced lugs or enlargements 9 adapted to engage with recesses 10 in the hub where they are rigidly but detachably held, and are adapted to extend through the stub-spokes 6 to be formed substantially midway of their length with loops 12 which may be circular in form, as shown in the drawings, or, if desired, may be U-shaped or V-shaped, or of any other suitable form. The spoke is then extended radially to engage with the rim 13 of the wheel.

The rim 13 is provided with a plurality of spaced stub-spokes 14 having slots therein 15 extending into the rim and formed with recesses 16, similar in all respects to the construction at the hub end of the spokes.

The outer ends of the spokes 8 are formed with lugs similar to those on the opposite end, and are designed to engage with the recesses 16 in the rim. In fact, the construction of the spring spokes is practically the same at both ends, and the means of holding them in the hub and the rim also the same. In operation, and when under ordinary conditions, the spokes 8 are approximately in the form as shown in Figure 1, and when pressure is exerted on the wheel the loops 12 will be extended until the extreme points contact with the spokes on the outside of the hub, thereby reducing the pressure to the two ends of the spokes 8. This will increase the resistance to such an extent that the unevenness of an ordinary road or the ruts therein will have practically no effect.

These spokes can also be used in suspension wheels with satisfactory results. The loops, under such circumstances, should be restricted. Furthermore, in a suspension wheel the spokes 8 should be constructed too short so that they can be tensioned in order to fit, while in a compression wheel the spokes should be made too long so that they must be compressed in order to fit. This storing of potential energy is done not to make the wheel as a whole more resilient for a load but to make the springs react more quickly.

As herein illustrated, the ends of the spokes are shown to be straight but this is only their normal position as, when even pressure is exerted upon them, they will become bowed.

Referring now more particularly to the rim 13, it is composed of two portions, 17 and 18, bolted together at 19 each bolt being provided with suitable spacers 20. The space between the rim portions 17 and 18 is adapted to be bridged by a metal ring 21 adapted to be supported by the shoulders 17 and 18 on said portions to form a central support for the tire. 24 are cross bars for holding the ring 21 in its place and are spaced apart as may be found necessary. The construction of the stub-spokes 14 comprises two portions, an outside portion and an inside portion, bolted on each side of the rim 13.

The tire 25 may be of any suitable construction and preferably provided with a gripping surface.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

A resilient vehicle wheel for motor cars and the like comprising a rim and a hub, an auxiliary hub provided with stub spokes, a plurality of spring spokes formed with a centrally disposed open loop and stub ends, a plurality of radial slots in the rim and auxiliary hub having a plurality of recesses at right angles thereto and communicating therewith adapted to receive the stub ends of the spokes and retain the spokes at compression or tension, and cover means to retain the spokes in the wheel.

In witness whereof I have hereunto set my hand.

ROBERT JULIUS STARR.